INVENTOR.
SAUL Y. LEVY
BY
Carl V. Olson
Attorney

Nov. 7, 1967 S. Y. LEVY 3,351,918

COMPUTER SYSTEM EMPLOYING SPECIALIZED INSTRUCTION EXECUTION UNITS

Filed Feb. 15, 1965

5 Sheets-Sheet 2

INVENTOR
SAUL Y. LEVY

BY Carl V. Olson

Attorney

INVENTOR.
SAUL Y. LEVY
BY
Carl V. Olson
Attorney

INVENTOR.
SAUL Y. LEVY
BY
Carl V. Olson
Attorney

Nov. 7, 1967 S. Y. LEVY 3,351,918

COMPUTER SYSTEM EMPLOYING SPECIALIZED INSTRUCTION EXECUTION UNITS

Filed Feb. 15, 1965 5 Sheets-Sheet 5

INVENTOR.
SAUL Y. LEVY
BY
Carl V. Olson
Attorney

United States Patent Office 3,351,918
Patented Nov. 7, 1967

3,351,918

COMPUTER SYSTEM EMPLOYING SPECIALIZED INSTRUCTION EXECUTION UNITS

Saul Y. Levy, Princeton, N.J., assignor to Radio Corporation of America, a corporation of Delaware
Filed Feb. 15, 1965, Ser. No. 432,774
6 Claims. (Cl. 340—172.5)

ABSTRACT OF THE DISCLOSURE

A computer system in which the many instructions are classified into groups of similar instructions. A number of instruction execution units are provided each capable of executing all instructions in a respective group of instructions. An operation group decoder senses the operation code of an instruction, determines the instruction group to which it belongs, and enables a corresponding instruction execution unit to receive and execute the instruction.

*General*

This invention relates to computer systems, and particularly to general-purpose high-speed electronic data processing computer systems in which a random-access memory is used for the storage of instructions and data.

The commercialization of computers began with so-called first generation computers in which vacuum tubes were employed as the active signal amplifying and gating devices. Second generation computers presently in use employ diode and transistor semiconductor device in place of vacuum tubes. A third generation of computers has been proposed which will employ integrated electronic circuit units each including many active and passive elements and connections all created on a single substrate by advanced batch fabrication techniques involving masking, etching, diffusing and depositing steps. The use of integrated circuit units is particularly attractive and economical when a large number of identical or similar units are needed.

A computer system may be viewed as including storage and transfer means for data (including instructions), and also control means for controlling the data storage and transfer means. Many if not most of the conventional general purpose computers in use are serial character-oriented computers in which a minor proportion of the hardware is used for data, and a major proportion of the hardware is used for controlling the data. The hardware employed for controlling the date paths is extremely complex, varied and irregular compared with the hardware employed in the data paths.

It is a general object of this invention to provide an improved computer system in which a major proportion of the circuits employed are similar and are similarly connected.

It is another object to provide an improved computer system in which a majority of the circuits included are located in data paths, and a minority of the circuits included are employed for performing control functions.

It is a further object to provide an improved computer system which can be economically produced by reason of including a high proportion of similar circuits adapted for construction by batch fabrication techniques.

In accordance with an example of the invention, there is provided a computer system in which the many required individual instructions and their respective incorporated operation codes are classified into groups of similar instructions. The computer system includes a random-access memory for storing instructions and data, means to staticize an instruction stored in the memory, and an operation group decoder to determine the group to which a staticized instruction belongs. A number of instruction execution units are provided each corresponding with one of the groups of instructions and each including an operation register, an individual operation decoder coupled to the operation register, an address register, and a data register. Means responsive to the outputs of the operation group decoder enable the operation register and the address register in a respective one of the instruction execution units to receive the staticized instruction. Means in an enabled instruction execution unit are responsive to the output of the respective individual operation decoder therein to employ the address register and data register in the enabled instruction execution unit for the execution of an individual instruction.

Figure 1:
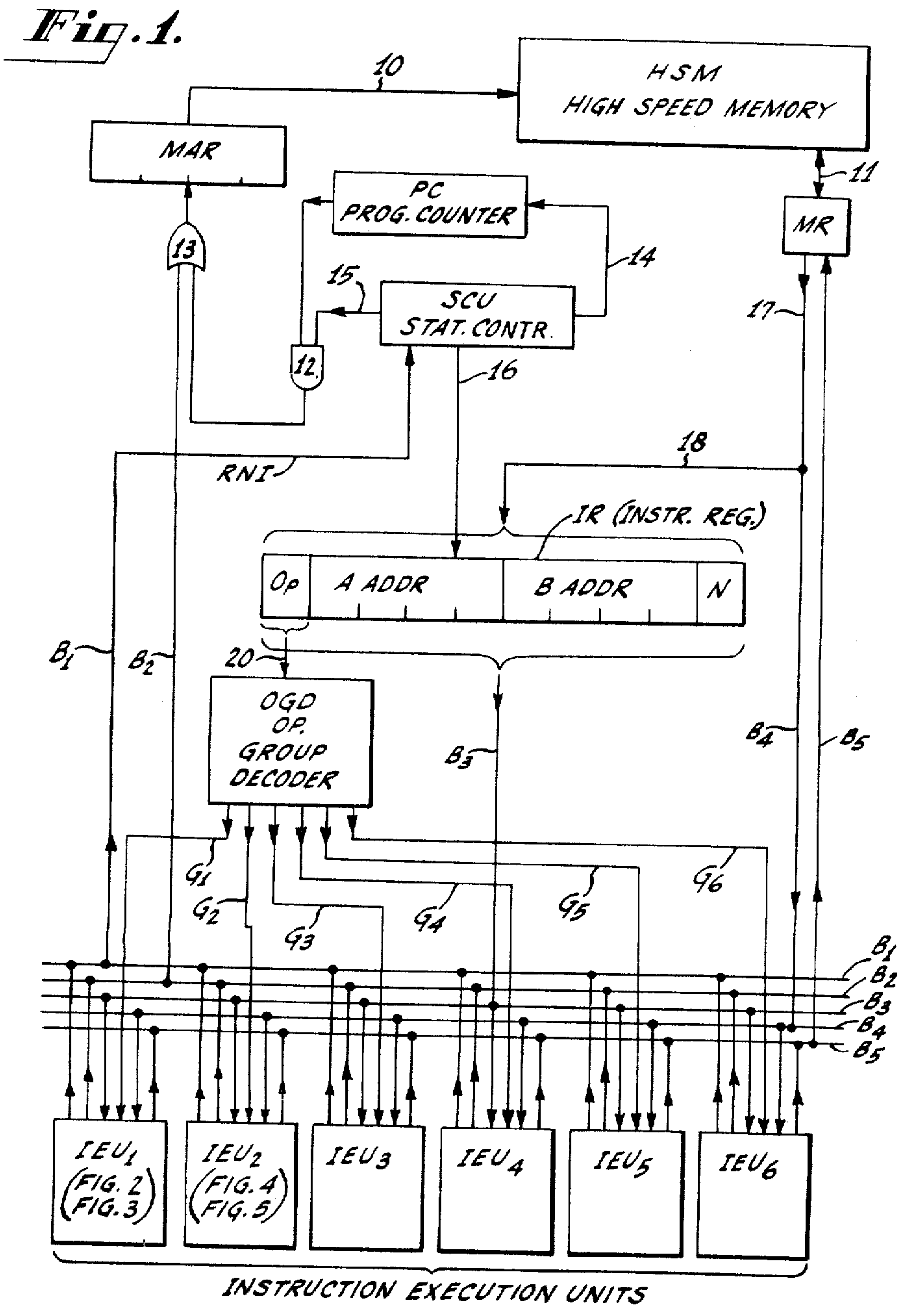
FIG. 1 is a block diagram of a computer system constructed according to the teachings of the invention.

Referring now in greater detail to the drawing, the general-purpose computer of FIG. 1 includes a random-access high-speed memory HSM used for the purpose of storing both instructions and data. A memory address register MAR is coupled over line 10 to memory HSM for the purpose of addressing any desired character stored in the memory. A memory register MR is connected over line 11 with memory HSM for the purpose of receiving an addressed character from memory, and for supplying a character to an addressed location in the memory. Lines 10, 11 and each of the other lines (or busses) referred to herein are understood to contain a number of individual leads each arranged to carry a separate bit of a word or character. For example, the line 10 my have 28 separate leads for the transfer of four seven-bit characters. A program counter means PC supplies addresses of instructions to the memory address register MAR through an "and" gate 12 and an "or" gate 13. A staticization control unit SCU has an output 14 connected to the program counter PC and an output 15 connected to the "and" gate 12 for the purpose of controlling the sequence of instruction addresses supplied to the memory address register MAR.

An instruction register IR is controlled over line 16 from the staticization control unit SCU. The instruction register IR is connected to receive instructions from memory HSM via line 11, memory register MR, and lines 17 and 18. The computer system illustrated, solely by way of example, is a system in which each alphanumeric or other intelligence character is represented by about seven binary information bits. Each register includes one flip-flop for each bit, or seven flip-flops for each character. The memory register MR is capable of storing one character at a time. Four characters are supplied to the memory address register MAR to address one desired character in memory HSM for transfer to the memory register MR.

The instruction register IR includes seventy flip-flops and is capable of storing a complete instruction word made up of ten characters. The instruction register IR includes an operation code portion *Op* for storing a one character operation code, an address register including an A ADDR portion for storing a four character address, a B ADDR portion for storing another four character address, and a portion N for storing a one character operation option. The ten characters of an instruction are transferred one character at a time from memory HSM through memory register MR to instruction register IR. The transfer is accomplished by the sequential operation of the program counter PC under the control of the staticization control unit SCU. When a complete instruction has been transferred from memory HSM to instruction register IR, the instruction is said to be staticized in the instruction register.

The operation code portion Op of the instruction register IR is coupled over line 20 to an operation group decoder OGD. The decoder OGD has a large number of outputs each connected to a respective one of an equal number of instruction execution units IEU. Although six such outputs $G_1$ through $G_6$ and six corresponding instruction execution units $IEU_1$ through $IEU_6$ are shown, a larger number may be needed.

The number of instruction execution units IEU is determined by analyzing the desired instruction repertoire and classifying the individual instructions into groups of similar instructions. Instructions involving similar operations and beng capable of using the same register storage locations in the manipulation of data and control information are classified in the same group. For example, one group of instructions executed by one instruction execution unit may include the instructions Locate Symbol Left, Locate Symbol Right, Transfer Data Left, Transfer Data Right, Transfer Data By Symbol Left, Transfer Data By Symbol Right, Translate By Table, and Transfer Symbol to Fill. Another group of instructions executed by another instruction execution unit may include And, Or, Exclusive-Or, Add, Subtract, and Compare.

Figure 2:
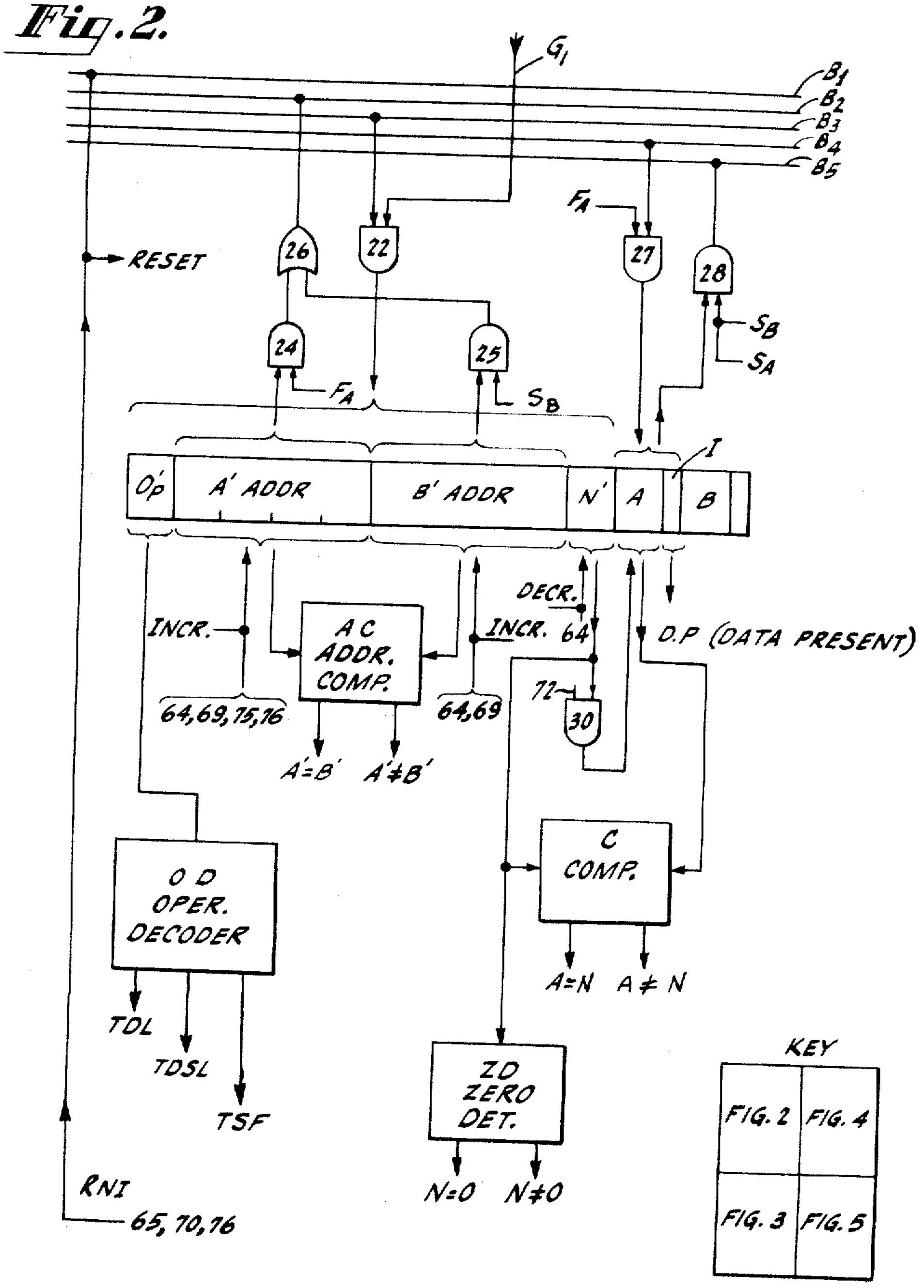
FIGS. 2 and 3 are diagrams which, taken together, illustrate the contents of one of the instruction execution units in the system of FIG. 1.
Figure 3:
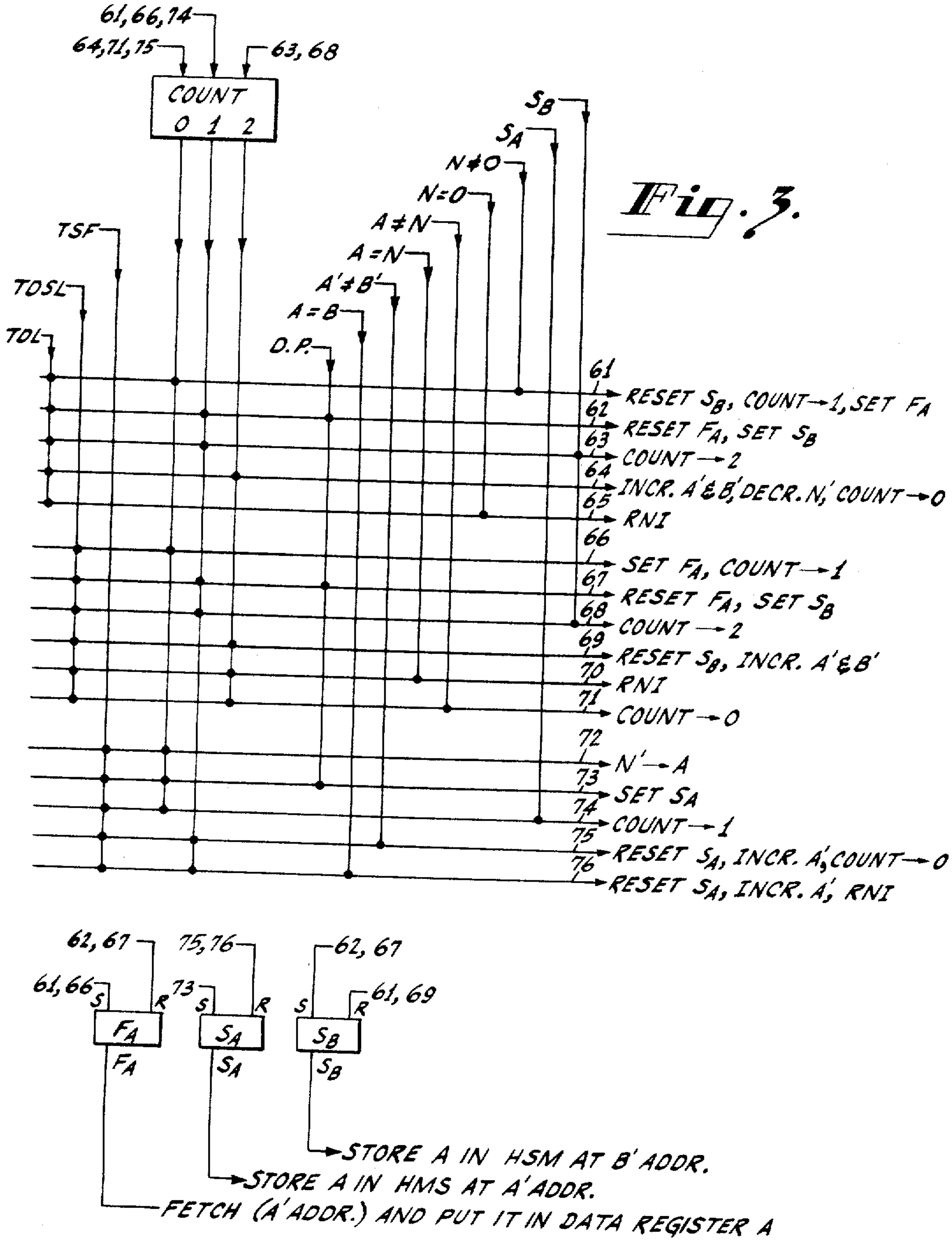

Busses $B_1$ through $B_5$ are coupled on one side respectively to the staticization control unit SCU, the memory address register MAR, the instruction register IR and the memory register MR. All the busses are coupled on the other side to all of the instruction execution units $IEU_1$ through $IEU_6$. One such exemplary instruction execution unit is illustrated in FIGS. 2 and 3. FIG. 2 includes registers for receiving an instruction from the instruction register IR in FIG. 1. The transfer of an instruction is made over bus $B_3$ and through a gate 22 under the control of an enabling signal on output $G_1$ from the operation group decoder OGD. The registers in FIG. 2 for the instruction include operation register $Op'$, address registers A′ ADDR and B′ ADDR, and an instruction option register N′. There is also data register A for one character of data and an associated one-bit register I for the storage of an indicator of the presence of data in register A. A second data register B is provided for use if needed. The address registers A′ ADDR and B′ ADDR are coupled through "and" gates 24 and 25, and through an "or" gate 26, to bus $B_2$. Bus $B_4$ is coupled through an "and" gate 27 to register A, and register A is coupled through an "and" gate 28 to bus $B_5$.

An individual operation decoder OD has an input coupled to receive the contents of the operation register $Op'$ and has a number of outputs for enabling the execution of respective difference corresponding individual instructions. The output TDL is for the instruction Transfer Data Left, the output TDSL is for the instruction Transfer Data By Symbol Left and the output TSF is for the instruction Transfer Symbol to Fill.

An address comparator AC has inputs coupled to the address registers A′ ADDR and B′ ADDR, and has outputs $A'=B'$ indicating equality and $A'\neq B'$ indicating inequality of the two addresses. The address registers have incrementing inputs Incr. for incrementing the addresses in the respective registers.

An "and" gate 30 is connected to enable the transfer of the contents of the register N′ to the data register A. A comparator C has inputs to receive the contents of the register N′ and the register A, and has outputs $A=N$ indicating equality, and $A\neq N$ indicating inequality. A zero decoder ZD is connected to receive the contents of the register N′ and has outputs $N=0$ and $N\neq 0$.

FIG. 3 is a diagram of a control matrix having vertical input leads connected by wires (not shown) to similarly labeled output leads appearing in FIG. 2. The matrix of FIG. 3 also includes horizontal output leads 61 through 76 connected by wires (not shown) to similarly labeled input leads in FIG. 2. For example, the outputs of the operation decoder OD in FIG. 2 are connected to the similarly labeled vertical input leads in the matrix of FIG. 3 for the purpose of determining which individual instruction is to be executed. The control matrix of FIG. 3 also includes a counter COUNT having counter outputs labeled 0, 1 and 2. The control matrix in FIG. 3 is illustrated in a diagrammatic form in which each horizontal line represents an "and" gate having inputs represented by connected vertical lines, and having an output to the right which is energized when all the connected vertical lines are energized.

FIG. 3 also includes control bit storage flip-flops $F_A$, $S_A$ and $S_B$ each having similarly labeled outputs and each having respective set and reset inputs labeled S and R. Each of these flip-flops is like one stage of the registers in FIG. 2 where about seven flip-flops are used for the storage of each character.

Figure 4:
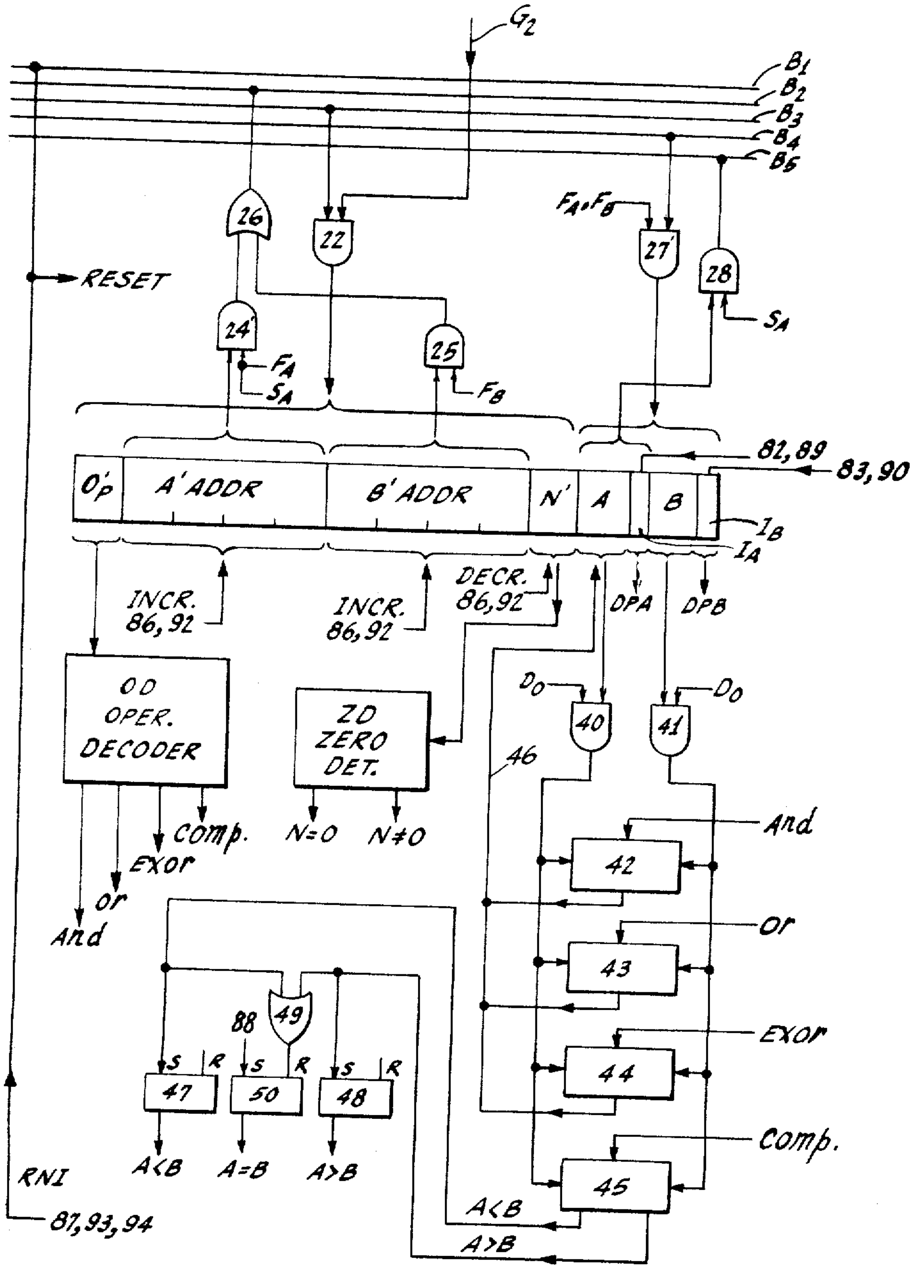
FIGS. 4 and 5 are diagrams which, taken together, illustrate the contents of another instruction execution unit in the system of FIG. 1.
Figure 5:
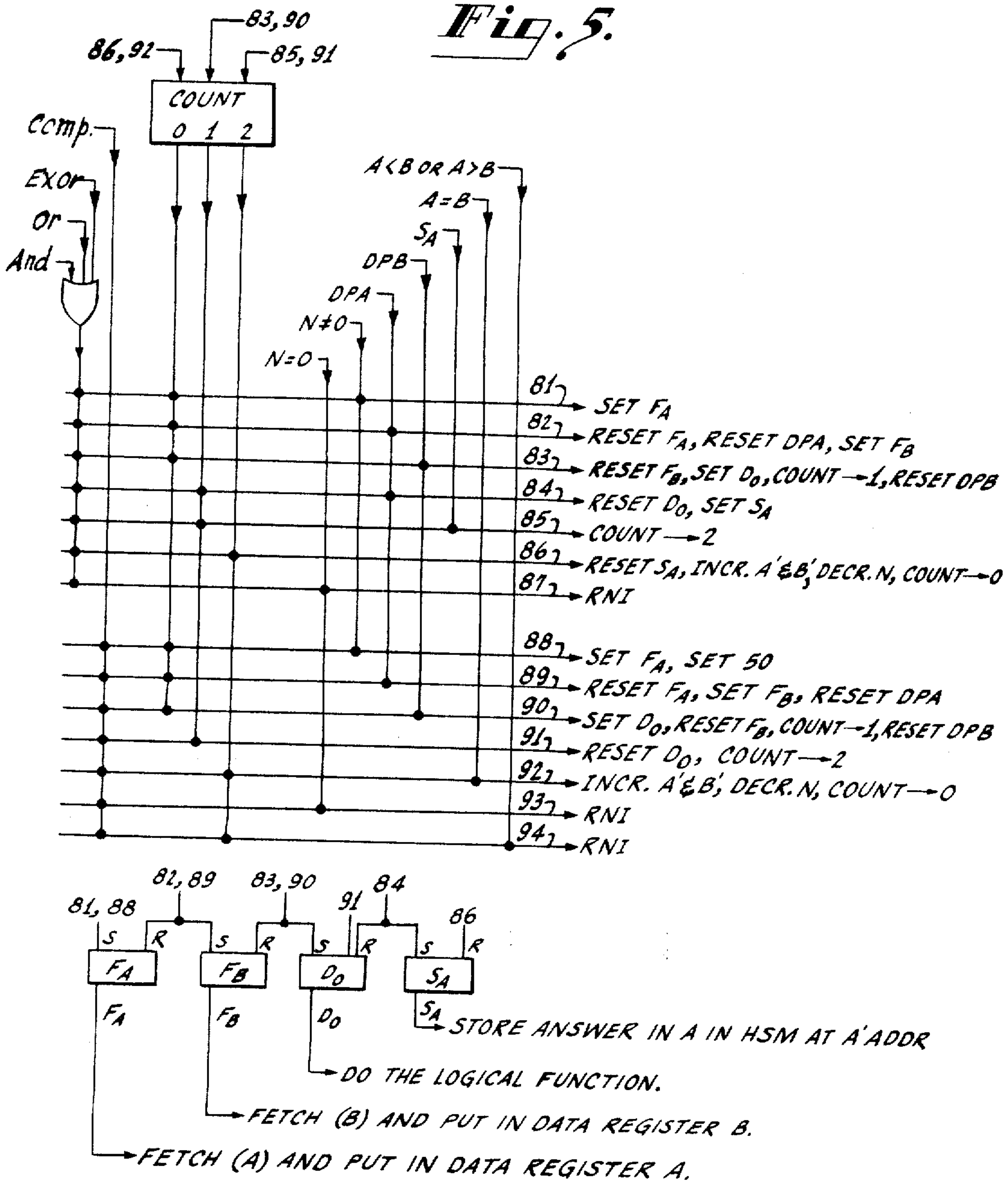

FIGS. 2 and 3, which have been described, constitute one instruction execution unit $IEU_1$ constructed for the execution of all of the individual similar instructions classified in one group of instruction. Similarly, FIGS. 4 and 5 illustrate another individual execution unit $IEU_2$ constructed for executing another group of similar instructions, namely the instructions And, Or, Exclusive-Or, and Compare. The instruction execution unit in FIG. 4 is similar to the unit in FIG. 2 in the connections from the busses $B_1$ through $B_5$ through gates to the registers. The gates and registers are similarly labeled. The instruction execution unit in FIGS. 4 and 5 differs from the unit in FIGS. 2 and 3 in some of the control circuits depending from the registers and in the connections of the control matrix.

The portion of the instruction execution unit $IEU_2$ which is shown by FIG. 4 includes data registers A and B having couplings through "and" gates 40 and 41 to inputs of an "And" logic unit 42, an "Or" logic unit 43, an "Exclusive-Or" logic unit 44 and a "Comparator" logic unit 45. Each of the logic units 42 through 45 includes means to accomplish its designated function on the characters in registers A and B by acting on the characters one bit at a time, and returning the result one bit at a time over the line 46 to register A. Each of logic units 42 through 45 is enabled solely when it receives a corresponding enabling signal from the operation decoder OD. The enabling signals are labeled "And," "Or," "Exor" and "Comp."

The comparator logic unit 45 has two outputs, one of which is energized when A is less than B and the other other of which is energized when A is greater than B. One output is connected to set a flip-flop 47, and the other output is connected to set a flip-flop 48. Both outputs are connected through an "or" gate 49 to reset an equality flip-flop 50 having an output labeled $A=B$.

FIG. 5 shows a control matrix having vertical inputs connected by wires (not shown) to correspondingly labeled outputs in FIG. 4. An "or" gate 53 passes any one of the designated logic signals from the operation decoder OD in FIG. 4. The horizontal lines 81 through 94 in the control matrix of FIG. 5 are connected to accomplish the labeled steps in the execution of the designated instructions. Four control flip-flops designed $F_A$, $F_B$, $D_O$ and $S_A$ have outputs connected to similarly labeled points in FIG. 4 over wires not shown.

In the operation of the computer system of FIG. 1, an instruction is initially staticized in the instruction register IR. This is accomplished by transferring the several characters of an instruction, one at a time, from the memory HSM through line 11, memory register MR, line 17 and line 18. Each character transferred is addressed in the memory HSM over line 10 by an address supplied to the memory address register MAR from the program counter PC under the control of the staticization control unit SCU.

When an instruction is staticized in the instruction register IR, the operation code in the operation code portion *Op* of the instruction register IR is supplied over line 20 to the operation group decoder OGD. The decoder OGD determines the group to which a staticized instruction belongs and energizes a corresponding one of its outputs $G_1$ through $G_6$. The energized output enables a corresponding one of the instruction execution units $IEU_1$ through $IEU_6$. Concurrently, the entire contents of the instruction register IR is supplied to the bus $B_3$ which is coupled to all of the instruction group execution units $IGEU_1$ through $IGEU_6$ for use by solely the enabled one of the units.

Reference is now made to FIG. 2 for a description of the operation of an exemplary instruction group execution unit $IEU_1$ when enabled by output $G_1$ of the operation group decoder OGD. The output on enabling line $G_1$ enables "and" gate 22 so that there is a transfer through gate 22 of the instruction in instruction register IR (FIG. 1) through the bus $B_3$ and through the "and" gate 22 (FIG. 2) to the operation register *Op'* (which may also be considered to include the operation option register N'), and to the address register including the two portions A' ADDR and B' ADDR. The operation code in the operation register *Op'* is applied to the individual operation decoder OD and results in the energization of one of its outputs. Each output corresponds with and enables one of the individual instructions executed by the particular instruction group execution unit. The three illustrative outputs of decoder OD are labeled TDL to represent Transfer Data Left, TDSL to represent Transfer Data By Symbol Left, and TSF to represent Transfer Symbol To Fill.

The contents of the address register portions A' ADDR and B' ADDR are supplied to an address comparator AC having equality and non-equality outputs $A'=B'$ and $A'\neq B'$. The contents of the operation code option register N' is supplied to a zero detector ZD having outputs $N=0$ and $N\neq 0$. The contents of the operation code option register N' is also supplied, with the contents of register A (if present) to a comparator C having outputs $A=N$ and $A\neq N$.

Reference is now made to FIG. 3, in addition to FIGS. 2 and 1, for a description of the operation of the system in the execution of an individual instruction TDL, Transfer Data Left. The vertical input line TDL in the control matrix of FIG. 3 is energized from the output TDL of the individual operation decoder OD in FIG. 2. The counter COUNT in FIG. 3 initially has an energized output "0" connected to the first horizontal line 61 in the control matrix. The first horizontal line 61 is also connected to the output $N\neq 0$ from the zero decoder ZD in FIG. 2. The line 61 and its connections diagrammatically represent an "and" gate. A horizontal line is energized when all of the connected vertical input lines are energized. The thus energized horizontal line 61 is connected, as indicated, to the set input S of flip-flop $F_A$, to the counter COUNT to change the count from "0" to "1," and to the reset input R of flip-flop $S_B$.

The set output of flip-flop $F_A$ is used to fetch the data character whose address is in register A' ADDR, and to place it in data register A. To this end, the output of flip-flop $F_A$ is coupled to the designated input of "and" gate 24 to effect a transfer of the address in register A' ADDR through "or" gate 26 and bus $B_2$ and "or" gate 13 (FIG. 1) to the memory address register MAR. The address then supplied over line 10 to memory HSM causes the addressed data character to be transferred through memory register MR, busses $B_4$ and "and" gate 27 (FIG. 2), which is also enabled by signal $F_A$, to the data register A. An additional bit is also transferred along with the data character to a one-bit register I to provide an output D.P. from the register indicating that a data character is present in register A. At this point in the operation, the first step in the execution of the instruction TDL has been accomplished by fetching a data character and placing it in register A.

The second step in the execution of the instruction TDL is represented by the second horizontal line 62 in the matrix of FIG. 3. The vertical inputs corresponding with the instruction TDL, the "1" input from the counter COUNT and the data present signal D.P. from register I causes an output from line 62 which, is labeled, effects the setting of flip-flop $S_B$ and the resetting of flip-flop $F_A$. The output of flip-flop $S_B$ effects the second step in the execution of the instruction, the second step being the transferring of the data in register A to memory HSM at the location determined by the address in register B' ADDR. This is accomplished by the application of the output of flip-flop $S_B$ to enable the "and" gate 25 to pass the address in register B' ADDR through "or" gate 26, bus $B_2$, "or" gate 13 (FIG. 1), memory address register MAR and line 10 to address the memory HSM. At the same time, the output of flip-flop $S_B$ (FIG. 3) enables "and" gate 28 (FIG. 2) to pass the contents of register A through bus $B_5$ and memory register MR (FIG. 1) to the addressed location in memory HSM.

The third step in the execution of the instruction, represented by the third horizontal line 63 in the matrix of FIG. 3, causes the setting of counter COUNT to "2."

The fourth step represented by the fourth horizontal line 64 in the matrix of FIG. 3, results in the application of incrementing signals to the inputs Incr. of register A' ADDR and B' ADDR, the application of a decrementing signal Decr. to the register N', and the setting of counter COUNT to "0."

The next step in the execution of the instruction depends on whether the character in register N' is equal to zero, or not equal to zero, as represented by the energized one of the two outputs of zero decoder ZD. If the $N\neq 0$ output of decoder ZD is energized, the first and following steps of the instruction are repeated. The first four steps of the instruction are continuously repeated until the contents of register N' becomes equal to zero as represented by the output $N=0$ from decoder ZD. The number constituting the N portion of the instruction initially supplied to the register N' is an operation code option written by the programmer to determine the number of characters which he desires to be transferred to the left, in the execution of the instruction. Every time a character is transferred, the contents of register N' is decremented. When the contents of register N' equals zero, the control matrix input $N=0$ energizes horizontal line 65 (FIG. 3) to cause a Request Next Instruction signal over line RNI in FIG. 2 and bus $B_1$ to the staticization control unit SCU in FIG. 1. This results in the supplying to the memory address register MAR of the address of the next following instruction to be performed by the computer. The signal RNI is also directed over lines not shown to reset inputs of registers in the instruction execution unit.

The instruction group execution unit in FIGS. 2 and 3 is also capable of executing other similar individual instructions. The control matrix in FIG. 3 is illustrated as being constructed to respond also to decoder signals TDSL and TSF for the execution of Transfer Data By Symbol Left and Transfer Symbol To Fill instructions. TDSL means transfer data characters to the left until a data character is reached which equals the symbol character in the portion N of the instruction. TSF means fill a specified area in memory with the symbol character in the portion N of the instruction. The several steps in the execution of each instruction can be understood from the designated inputs to the control matrix of FIG. 3 and the numbered and self-explanatory outputs therefrom. The many individual instructions which can be performed by the unit of FIGS. 2 and 3 are sufficiently similar so that a minimum of control hardware peculiar to the instruction is required.

FIGS. 4 and 5 illustrate another instruction group execution unit capable of performing the instructions And, Or, Exclusive-Or, and Compare. If the instruction in the registers Op′, A′ ADDR, B′ ADDR and N′ in FIG. 4 is an "And" instruction, and "And" output from decoder OD energizes the logic unit 42, and also passes through "or" gate 53 to the control matrix in FIG. 5. The first horizontal line 81 in the matrix of FIG. 5 sets the flip-flop $F_A$ in response to the three vertical input conditions. The output of flip-flop $F_A$ enables the gate 24′ in FIG. 4 to accomplish the fetching of the character in memory HSM whose address is in register A′ ADDR, and the transfer of the character to data register A. The second horizontal line 82 in the control matrix of FIG. 5 causes the setting of flip-flop $F_B$ to accomplish the fetching of a data character from memory HSM and the transferring of the character to register B. The third horizontal line 83 in the control matrix of FIG. 5 causes the setting of flip-flop $D_0$, which in turn enables "and" gates 40 and 41 to pass the data characters A and B to the logic unit 42, which is enabled by an input labeled "And." The result of the unit 42 in performing the "And" function is applied over line 46 to the register A. The fourth step, represented by the fourth horizontal line 84 in the matrix of FIG. 5, acts through flip-flop $S_A$ to transfer the result present in register A through gate 28 to the memory HSM. Thereafter, registers A′ and B′ are incremented by signals Incr., and register N′ is decremented by signal Decr., and the steps are repeated until the contents of register N′ equals "0."

The operation of the instruction execution unit of FIGS. 4 and 5 in the performance of the compare function by logic unit 45 involves a first step in which the equality flip-flop 50 is set to provide an output $A=B$. Thereafter, the output of the comparator unit 45 sets a corresponding one of flip-flops 47 and 48, and resets the equality flip-flop 50, if the data characters A and B are unequal. The outputs of flip-flops 47, 48 and 50 go to utilization indicators or other utilization units (not shown) elsewhere in the computer system.

In a computer system according to the invention, the many instruction execution units are very similar to each other. All instruction execution units include registers, and gated couplings to the busses, which are similar. The registers in each instruction execution unit contain many flip-flops (about a hundred in the example), but they are "regular" and thus adapted for economical batch fabrication. The control matrices in the many instruction execution units may be physically very similar and may differ only in the points of connection in the matrix which determine the particular functions performed. The control portions of the many instruction execution units which differ markedly in the many units constitute a minor part, rather than a major part, of the hardware of the computer. The control circuits are relatively simple and few in number because of the presence of the many registers. Therefore, the computer system organization according to the invention is one wherein the regularity of the circuits incorporated permits great economies when constructed by integrated circuit batch fabrication techniques. This is true even though a computer according to the invention may include a greater total number of circuits than a comparable computer according to the prior art.

What is claimed is:

1. A computer system in which the many individual instructions and their respective incorporated operation codes are classified into groups, comprising a random access memory for storing instructions and data, means to staticize an instruction stored in said memory, an operation group decoder to determine to group to which a staticized instruction belongs, a number of instruction execution units each corresponding with one of said groups of instructions, each instruction execution unit including an operation register, an individual operation decoder coupled to the operation register, an address register, and a data register, means responsive to the outputs of said operation group decoder to enable the operation register and the address register in a respective one of said instruction execution units to receive said staticized instruction, and means in an enabled instruction execution unit responsive to the output of the respective individual operation decoder therein to employ the address register and data register in the enabled instruction execution unit for the execution of an individual instruction.

2. A computer system in which the many individual instructions and their respective incorporated operation codes are classified into groups, comprising a random access memory for storing instructions and data, means to staticize an instruction stored in said memory, an operation group decoder to determine to group to which a staticized instruction belongs, a number of instruction execution units each corresponding with one of said groups of instructions, each instruction execution unit including an operation register, an individual operation decoder coupled to the operation register, an address register, and a data register, busses for coupling said staticized instruction to the operation and address registers in all of said instruction execution units, and busses for coupling said memory with the address registers and the data registers is all of said instruction execution units, means responsive to the outputs of said operation group decoder to enable a respective one of said instruction execution units, and means in each instruction execution unit responsive to the output of the respective individual operation decoder to execute a corresponding individual instruction.

3. A computer system in which the many individual instructions and their respective incorporated operation codes are classified into groups, comprising a random access memory, an instruction register including an operation code portion, means to staticize an instruction from said memory in said instruction register, an operation group decoder coupled to the operation code portion of said instruction register to determine the group to which an instruction in the instruction register belongs, and a number of instruction execution units equal to the number of groups of instructions, each instruction execution unit including an operation register and an address register enabled by a respective output of said operation group decoder to receive the contents of said instruction register, each instruction execution unit also including a data register, an individual operation decoder coupled to the operation register to determine which individual instruction is in the operation register and address register, and means responsive to the output of said individual operation decoder to execute the corresponding individual instruction.

4. A computer system in which the many individual instructions and their respective incorporated operation codes are classified into groups of similar instructions, comprising a main memory having a memory register, an instruction register, including an operation code portion, coupled to said memory register, means to staticize an instruction from said memory via said memory register to said instruction register, an operation group decoder coupled to the operation code portion of said instruction register to determine the operation code group to which an instruction in the instruction register belongs, and an instruction execution unit for each of said groups of instructions, each instruction execution unit including an operation register and an address register enabled by a respective output of said operation group decoder to receive the contents of said instruction register, each instruction execution unit also including a data register, an individual operation decoder coupled to the operation register, and means responsive to the output of said individual operation decoder to effect the transfer of data between said main memory and said data register via said memory register and to operate on the data in the execution of a corresponding individual instruction.

5. A computer system in which the many individual instructions and their respective incorporated operation codes are classified into groups, comprising a random access memory having a memory address register and a memory register, an instruction register including an operation code portion, coupled to said memory register, means to staticize an instruction from said memory in said instruction register.

an operation group decoder coupled to the operation code portion of said instruction register to determine the group to which an instruction in the instruction register belongs, a number of instruction execution units equal to the number of groups of instructions, each instruction execution unit including an operation register, an individual operation decoder coupled to the operation register, an address register, and a data register, busses coupling said instruction register to the operation and address registers in all of said instruction execution units, busses coupling said memory address register with the address registers in all of said instruction execution units, and busses coupling said memory register with the data registers in all of said instruction execution units, enabling connections from outputs of said operation group decoder to respective ones of said instruction execution units, and means in each instruction execution unit responsive to the output of the respective individual operation decoder to execute a corresponding individual instruction.

6. A computer system in which the many individual instructions and their respective incorporated operation codes are classified into groups of similar instructions, comprising a random access main memory having a memory address register and a memory register, an instruction register, including an operation code portion, coupled to said memory register, means to staticize an instruction in said instruction register by supplying an address to said memory address register and transferring the addressed instruction from the memory through said memory register to said instruction register, an operation group decoder coupled to the operation code portion of said instruction register to determine the operation code group to which an instruction in the instruction register belongs, and an instruction execution unit for each of said groups of instructions, each instruction execution unit including an operation register and an address register enabled by a respective output of said operation group decoder to receive the contents of said instruction register, each instruction execution unit also including a data register, and an individual operation decoder coupled to the operation register to determine the individual one of the instructions called for by the operation code of the instruction, and means responsive to the output of said individual operation decoder to execute the corresponding individual instruction by (a) transferring the contents of the address register in the instruction execution unit to said memory address register to fetch data from the memory and transfer it through said memory register to the data register, (b) operating on the data, and (c) returning the result through said memory register to an address in the memory determined by the contents of the address register in the instruction execution unit.

References Cited

UNITED STATES PATENTS

| | | | |
|---|---|---|---|
| 3,106,698 | 10/1963 | Unger | 340—172.5 |
| 3,229,260 | 1/1966 | Falkoff | 340—172.5 |

ROBERT C. BAILEY, *Primary Examiner.*

G. SHAW, *Assistant Examiner.*